United States Patent [19]
Jüngling et al.

[11] Patent Number: 5,830,961
[45] Date of Patent: Nov. 3, 1998

[54] PREPARATION OF POLYACRYLATES

[75] Inventors: Stephan Jüngling, Mannheim; Christof Mehler, Ludwigshafen; Helmut Schlaad, Bad Kreuznach; Bardo Schmitt, Mainz; Axel Mueller, Wiesbaden; Horst Weiss, Karlsruhe; Susanne Steiger, Römerberg, all of Germany

[73] Assignee: BASF Aktiengesellschaft, Ludwigshafen, Germany

[21] Appl. No.: 897,684

[22] Filed: Jul. 21, 1997

[30] Foreign Application Priority Data

Jul. 23, 1996 [DE] Germany .............. 196 29649.8

[51] Int. Cl.⁶ .................. C08F 4/52; B01J 31/14
[52] U.S. Cl. .............. 526/177; 526/187; 526/329.7; 502/132
[58] Field of Search .................... 526/177, 187; 502/132

[56] References Cited

U.S. PATENT DOCUMENTS 5,563,275  10/1996  Gentry et al. .............. 526/194
5,656,704  8/1997  Wang et al. .............. 526/187

FOREIGN PATENT DOCUMENTS 2 292 743  3/1996  United Kingdom .

OTHER PUBLICATIONS

Mechanism of Anionic Polymerization of . . . Macromol. Rapid Commun. 15, 517–524 (1994).

Controlled Polymerization of Acrylates . . . , J.M.S.–Rev. Macromol. Chem. Phys., C34(2), 243–324 (1994).

*Primary Examiner*—Joseph L. Schofer
*Assistant Examiner*—Wu C. Cheng
*Attorney, Agent, or Firm*—Keil & Weinkauf

[57] ABSTRACT

Polyacrylates based on alkyl acrylates or alkyl alkylacrylates or mixtures thereof as monomers are prepared in the presence of an initiator composition containing an alkali metal ester enolate and an organic aluminum compound or a mixture thereof, by a process in which an ester which differs from the monomers is present in the initiator composition, the carbon atom α to the ester group having no acidic proton.

8 Claims, No Drawings

PREPARATION OF POLYACRYLATES

DESCRIPTION

The present invention relates to a process for the preparation of polyacrylates based on alkyl acrylates or alkyl alkylacrylates or mixtures thereof as monomers in the presence of an initiator composition containing an alkali metal ester enolate and an organic aluminum compound. The present invention furthermore relates to the initiator composition and a process for the preparation of the initiator composition and the use thereof.

The anionic polymerization of acrylates, such as methyl methacrylate, is difficult, since the carbonyl group gives rise to a wide range of secondary reactions. A number of methods with the aim of permitting better control of the polymerization have therefore been developed (J. M. S.-Rev. Macromol. Chem. Phys., C34(2), 243–324(1994)).

For example, the mechanism of the polymerization of (meth)acrylates in the presence of alkylaluminum in toluene was investigated (Macromol. Rapid Commun. 15, 517–525 (1994)). The system methyl pivalate/alkylaluminum served as a model for the reaction of alkylaluminum with methyl methacrylate. The polymerization of alkyl acrylates in the presence of alkyllithium and alkylaluminum in toluene was also discussed. However, the rate of this reaction is too low for industrial purposes.

DE-A 195 30 398 discloses the anionic polymerization of alkyl methacrylates in the presence of organolithium, an organic aluminum compound and pyridine as an initiator composition. Although the polymerization can be relatively well controlled by means of this initiator composition, the pyridine causes problems in the working up of the reaction mixture. Owing to its toxicity, pyridine is undesirable in the product, even in small amounts, particularly if the end products are used, for example, in the household or toy sector.

A widespread problem in the anionic polymerization of acrylates in the presence of alkyllithium and alkylaluminum compounds is the formation of gels, which presumably form by the coordination of a plurality of molecules (monomers or polymer chains already formed) at the metal centers. This phenomenon results on the one hand in the reaction mixture being difficult to handle and on the other hand the molecular weight distribution of the polyalkylacrylates being broad and complete monomer conversion frequently not being achieved.

It is an object of the present invention to provide a novel initiator composition which permits good control of the polymerization reaction. In particular, it is intended to provide a process which, even at relatively high temperatures, leads to products having a low molecular weight distribution. Furthermore, it is intended to make it possible to achieve highly quantitative conversions and to prepare block copolymers. Moreover, the reaction rate should be suitable for industrial purposes. It is a further object of the present invention to provide a process which is substantially insensitive to the impurities present in monomers and solvents of technical quality. Furthermore, it is intended to provide a process in which gel formation is avoided.

We have found that this object is achieved by a process for the preparation of polyacrylates based on alkyl acrylates or alkyl alkylacrylates or mixtures thereof as monomers in the presence of an initiator composition containing an alkali metal ester enolate or a mixture thereof and an organic aluminum compound, wherein an ester which differs from the monomers and whose carbon atom α to the ester group has no acidic proton is present in the initiator composition. Further embodiments are described in the claims and in the description.

Suitable polyacrylates are both homopolymers and copolymers as well as block copolymers. For example, copolymers can be prepared from mixtures of different alkyl acrylates or different alkyl alkylacrylates or mixtures of alkyl acrylates with alkyl alkylacrylates. Block copolymers can be obtained, for example, from different alkyl acrylates or different alkyl alkylacrylates or from alkyl acrylates and alkyl alkylacrylates. In the novel process, both two-block copolymers and multiblock copolymers can be prepared. The composition, based on weight, of the blocks may vary within wide limits.

The suitable alkyl alkylacrylates include those having 1 to 20, preferably 1 to 10, in particular 1 to 6, carbon atoms in the ester radical. The ester radical may be either linear or branched. The ester radical may furthermore be a cycloalkyl radical. It is preferably linear. The alkyl group in the acrylate radical is in general of 1 to 10, preferably 1 to 6, in particular 1 to 3, carbon atoms. The alkyl group in the acrylate radical may be either linear or branched, preferably linear. The methyl group is particularly preferred. The alkyl alkylacrylates may also be substituted by one or more halogen atoms. Examples are methyl methacrylate, ethyl methacrylate, 2,2,2,-trifluoroethyl methacrylate, n-propyl methacrylate, isopropyl methacrylate, n-butyl methacrylate, sec-butyl methacrylate, tert-butyl methacrylate, n-pentyl methacrylate, isopentyl methacrylate, n-hexyl methacrylate, 2-ethylhexyl methacrylate, cyclohexyl methacrylate, n-octyl methacrylate, n-decyl methacrylate and dihydrodicyclopentadienyl methacrylate. Methyl methacrylate is particularly preferably used.

Among the alkyl acrylates, $C_1$–$C_{20}$-alkyl acrylates are preferred. $C_1$–$C_{10}$-alkyl acrylates are particularly preferred, especially $C_1$–$C_8$-alkyl acrylates. The alkyl radicals may be either linear or branched or may form a ring. For example, methyl acrylate, ethyl acrylate, n-propyl acrylate, isopropyl acrylate, n-butyl acrylate, isobutyl acrylate, tert-butyl acrylate, n-pentyl acrylate, isopentyl acrylate, n-hexyl acrylate, 2-ethylhexyl acrylate, cyclohexyl acrylate, n-octyl acrylate, n-decyl acrylate and dihydrodicyclopentadienyl acrylate may be used.

Preferred block copolymers are those which are composed of methyl methacrylate and n-butyl acrylate blocks, tert-butyl acrylate blocks, tert-butyl methacrylate or 2-ethylhexyl acrylate blocks, in particular of methyl methacrylate and tert-butyl methacrylate.

According to the invention, the initiator composition contains an alkali metal ester enolate or a mixture of different enolates of this type. Preferred alkali metals are lithium, sodium and potassium. The choice of the alkali metal influences, inter alia, the rate of the polymerization reaction, so that the choice of the metal depends on the monomers to be converted and on the desired reaction rate. In general, lithium enolates are preferred.

The alkali metal enolates which, according to the invention, are contained in the initiator composition may be prepared separately and used as such.

The preparation of alkali metal enolates is known per se. They can be prepared, for example, by reacting an alkali metal salt, an alkyl-alkali metal compound or an alkali metal with an ester which has at least one acidic proton on the α-carbon atom. Of course, it is also possible to convert diesters into the alkali metal ester enolates contained according to the invention. The alkali metal enolates thus obtained can then be isolated and purified.

The alkali metal enolates are preferably prepared using an ester of the general formula I or II:

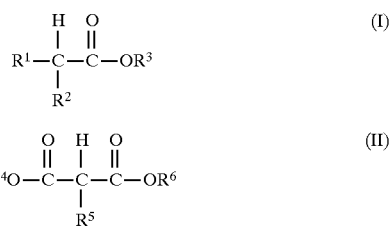

where $R^1$ to $R^6$ may be identical or different and, independently of one another, are each $C_1$–$C_{10}$-alkyl or $C_6$–$C_{18}$-aryl. $R^1$, $R^2$ and $R^5$ may furthermore be hydrogen. The alkyl radicals may be either linear or branched. In preferred esters I or II, $R^3$, $R^4$ and $R^6$ are each $C_1$–$C_5$-alkyl, such as methyl, ethyl, n-propyl, isopropyl, n-butyl, isobutyl or tert-butyl, among which methyl and tert-butyl are particularly preferred. $R^1$, $R^2$ and $R^5$ are preferably $C_1$–$C_8$-alkyl radicals, among which methyl, ethyl, isobutyl and 2,2-dimethylpentyl are particularly preferred.

For example, lithium methyl isobutyrate or lithium tert-butyl isobutyrate is obtainable from esters of the general formula I. For example, 2-lithium-2,4,4-trimethylpentanoic acid methyl ester enolate can also be prepared from the esters of the general formula I. Lithium alkyl malonates, such as 2-lithium-2-$C_1$–$C_5$-alkyl-1,3-propanedicarboxylic acid dialkyl ester enolates, in particular 2-lithium-2-ethyl-1,3-propanedicarboxylic acid dimethyl ester enolate, can be prepared from the esters of the general formula II.

It is also possible to use different alkali metal ester enolates, so that the initiator composition contains different alkali metal ester enolates.

Alternatively and preferably, it is possible to produce the alkali metal ester enolates in situ.

According to the invention, an alkyl- or alkylaryl-alkali metal compound is used as the starting material. Its alkyl radical has, as a rule, 1 to 10, preferably 1 to 6, carbon atoms and may be linear, branched or cyclic. The alkylaryl radical has in general 1 to 10, preferably 1 to 6, carbon atoms in the alkyl group. The alkyl group may contain one or more aryl radicals. Suitable aryl radicals are both monocyclic and polycyclic aryl radicals which, as a rule, have 6 to 18 carbon atoms. A preferred aryl radical is phenyl. Alkylaryl-alkali metal compounds are obtainable, for example, by reacting styrene or substituted styrenes, such as α-methylstyrene or 1,1-diphenylethane or styrenes alkylated on the nucleus, with an alkyl-alkali metal compound, for example n-butyllithium, sec-butyllithium or tert-butyllithium. Instead of styrene or its derivatives, it is also possible to use oligomers or polymers of these compounds. Typical alkyl- or alkylaryl-alkali metal compounds are, for example, n-butyllithium, sec-butyllithium, tert-butyllithium, diphenylmethyllithium, diphenylmethyl sodium, diphenylmethyl potassium, 1,1,4,4-tetraphenylbutane-1,4-dilithium, 1,1,4,4-tetraphenylbutane-1,4-disodium, 1,1,4,4-tetraphenylbutane-1,4-dipotassium, 1-phenylhexyllithium, 1,1-diphenylhexyllithium, 3-methyl-1-phenylpentyllithium, 1,3-dimethyl-1-phenylpentyllithium and 3-methyl-1,1-diphenylpentyllithium.

For the preparation of the alkali metal ester enolate, the respective alkyl- or alkylaryl-alkali metal compound is reacted with a stoichiometric amount of an alkyl alkylacrylate before the reaction of the main amount of monomers.

According to the invention, a stoichiometric amount is understood as meaning amounts of alkyl- or alkylaryl-alkali metal compound to monomer in a molar ratio of from 1:0.8 to 1:2. The molar ratio of the alkali metal compound to the monomer is preferably from 1:0.9 to 1:1.5. Equimolar amounts are particularly preferred. Different alkyl or alkylaryl acrylates may also be used. It is also possible to use different alkyl alkylacrylates, so that different alkali metal ester enolates are obtained in the initiator composition.

In addition to an alkali metal ester enolate, the initiator composition contains, according to the invention, an organic aluminum compound. According to the invention, it is also possible to use different aluminum compounds. Alkylaluminum compounds are preferred. The alkyl radicals on the aluminum may be identical or different and contain in general 1 to 10, preferably 1 to 6, carbon atoms. They may be linear or branched or cyclic. Examples of aluminum compounds are trimethylaluminum, triethylaluminum, triisopropylaluminum, triisobutylaluminum, tri(neopentyl) aluminum and tri(norbornyl)aluminum.

According to the invention, the initiator composition contains an ester. This differs from the alkyl alkylacrylates used as monomers and, according to the invention, has no acidic proton on the carbon atom which is α to the ester group. According to the invention, this ester is also understood as meaning a mixture of different esters of this type. The esters which are contained in the initiator composition may have either one ester group or a plurality of ester groups, for example two, in the molecule. In general, these esters are monomeric compounds. Both aliphatic and aromatic esters are suitable. It is also possible to use esters which are derived from an aliphatic acid and an aromatic alcohol, or vice versa.

Pivalic esters (2,2-dimethylpropanoic esters), are preferred, including $C_1$–$C_{10}$-alkyl pivalate, such as methyl pivalate, ethyl pivalate, n-propyl pivalate, isopropyl pivalate, n-butyl pivalate, isobutyl pivalate, tert-butyl pivalate, n-hexyl pivalate or cyclohexyl pivalate. Further preferred esters which may be contained in the initiator composition are benzoic esters, such as $C_1$–$C_{10}$-alkyl benzoates. The benzoates which may be used according to the invention include methyl benzoate, ethyl benzoate, n-propyl benzoate, isopropyl benzoate, n-butyl benzoate, isobutyl benzoate, tert-butyl benzoate, n-hexyl benzoate and cyclohexyl benzoate. For example, phthalic esters, such as $C_1$–$C_{30}$-dialkyl phthalates, preferably $C_1$–$C_{20}$-dialkyl phthalates, may also be used as esters in the initiator composition, preferred dialkyl phthalates being those whose alkyl radicals are identical, for example dimethyl phthalate, diethyl phthalate, di-n-propyl phthalate, diisopropyl phthalate, di-n-butyl phthalate, diisobutyl phthalate, di-n-hexyl phthalate, dicyclohexyl phthalate, di-n-octyl phthalate and diisooctyl phthalat (di(2-ethylhexyl) phthalate).

Methyl pivalate, methyl benzoate and diisooctyl phthalate (di(2-ethylhexyl) phthalate) are particularly preferred.

The composition of the initiator may be varied within wide limits depending on the desired polymerization result or desired polymerization parameters, such as the rate of the reaction. In general, the initiator composition contains the alkali metal ester enolate, the aluminum compound and the ester in molar ratios of 1:0.5 to 10:1 to 1000. Molar ratios of 1:1 to 5:10 to 200, in particular 1:2 to 4:20 to 100, are preferred.

As a rule, the alkali metal ester enolate is used in molar ratios of from 1:5 to 1:10000 relative to the monomer. Preferred molar ratios of alkali metal ester enolate to monomer are from 1:10 to 1:5000, in particular from 1:50 to 1:3000.

The polymerization may be carried out in the presence or absence of a solvent. In general, the polymerization is carried out in a solvent. Nonpolar solvents are preferably used. These include aromatic hydrocarbons such as toluene, benzene, xylene or ethylbenzene. However, it is also possible to use mixtures of different nonpolar solvents, such as mixtures of toluene with ethylbenzene or mixtures of aromatic and aliphatic hydrocarbons, e.g. cyclohexane, hexane or pentane. A preferred solvent is toluene or ethylbenzene. Solvents whose oxygen content is reduced are preferably used.

The reaction of the monomers can be carried out at different dilutions. For example, the amount by weight of monomers in the total batch may be from 0.5 to 80%, preferably from 1 to 50%.

In principle, the components of the initiator composition, the solvent and the monomers can be mixed with one another in very different orders. For example, all initiator components may be initially taken and the solvent and monomers then added. However, it is also possible initially to use some of the initiator components and subsequently to add some other initiator components. It is also possible to add further amounts of initiator composition during the polymerization reaction. Preferably, however, the solvent is initially taken and the aluminum compound first added. The alkali metal enolate, which was prepared separately, can then be added to this mixture. Alternatively, as described above, an alkali- or alkylaryl-alkali metal compound may be added and then be converted in situ into the alkali metal enolate by reaction with a stoichiometric amount of an alkyl alkylacrylate. In general, the ester is then added. In a preferred embodiment, the monomers are added finally. Premixes of ester and aluminum compound and monomer and aluminum compound are preferably prepared. In general, the molar ratios of ester or monomer to the aluminum compound in these premixes are from 100 to 1000:1. The individual components of the initiator composition may be used as such. It is also possible to use the components of the initiator composition as a solution or dispersion in one of the stated solvents or solvent mixtures. The components are preferably each used as solution in pentane, hexane, toluene, ethylbenzene or cyclohexane. The total amount of monomers may be added all at once, stepwise or continuously.

The reaction can be carried out, for example, at from −78° to +50° C., preferably from −30° to +30° C., in particular from −20° to 0° C. During the reaction, either the temperature can be kept virtually constant or the reaction can be subjected to a temperature program.

After the molecular weight has been reached, the polymerization reaction is stopped as a rule by adding a protic substance, such as a protic solvent, for example an alcohol, such as methanol or ethanol, or acetic acid, formic acid, hydrochloric acid or water or a mixture of these solvents.

The reaction mixture can then be worked up, for example, by methods known per se. Thus, the polyacrylate obtained can be precipitated, for example by means of a lower alcohol or water, or the solvent can be removed from the reaction mixture.

The polyacrylates, preferably polymethyl methacrylates, obtainable by the novel process generally have number average molecular weights ($M_n$) of from 5000 to 1000000, preferably from 5000 to 300000 g/mol. Since gel formation occurs only to a minor extent, if at all, in the novel process, they have a narrow molecular weight distribution, expressed as the ratio of weight average molecular weight to number average molecular weight $M_w/M_n$. As a rule, $M_w/M_n$ at 0° C. is from 1.05 to 1.6, preferably from 1.05 to 1.4. Moreover, polyacrylates based on highly syndiotactic alkyl alkylacrylates are obtained by the novel process. The amount of syndiotactic triads rr in these polyacrylates is in general from 50 to 85%, preferably from 60 to 80%.

The novel process is distinguished on the one hand by the fact that the process parameters, such as reaction rate and temperature, can be readily controlled. On the other hand, complete or virtually complete conversions are achieved. In addition, the process is substantially less sensitive than known processes to impurities which are present in the solvents and monomers of technical quality.

EXAMPLES

Starting Materials tert-Butyllithium (tBuLi): dissolved in pentane

Triethylaluminum ($AlEt_3$): dissolved in toluene

Trimethylaluminum ($AlMe_3$): dissolved in toluene

Methyl pivalate (MPiv): dried over calcium hydride, degassed and distilled or degassed with nitrogen and dried by means of alumina Diisooctyl phthalate (DOP): degassed with nitrogen, dried by means of alumina Methyl acetate (MA)

Ethyl formate (EF)

Toluene: stirred over Na/K alloy and distilled

Ethylbenzene: degassed with nitrogen and dried by means of alumina

Methyl methacrylate (MMA): degassed with nitrogen, dried by means of alumina t-Butyl methacrylate (tBuMA): degassed with nitrogen, dried by means of alumina n-Butyl acrylate (nBuA): dried over calcium hydride, degassed and distilled Methanol: degassed by means of nitrogen Glacial acetic acid: technical-grade The molecular weights $M_{n/theor.}$ are obtained from the degree of polymerization, $P_n$, and the molar mass $M_{Monomer}$ of the monomers used and is calculated from the quotient of the molar amount of monomers used, $mol_{Monomer}$, and the molar amount of alkali metal enolate used, $mol_{Alkalienolat}$, multiplied by the molar mass of the monomer used:
$M_{n\ theor.} = P_n \times M_{Monomer} = (mol_{Monomer}/mol_{Alkalienolat}) \times M_{Monomer}$.

The molecular weights $M_w$ and $M_n$ were determined by gel permeation chromatography (polymethyl methacrylate calibration).

The tacticity of the products obtained was determined by $^1$H-NMR.

Examples 1 to 5

The reaction was carried out under nitrogen.

Preparation of the initiator composition:

1.6 mmol of $AlEt_3$ (dissolved in toluene), 0.45 mmol of tBuLi (dissolved in pentane) and 68 ml of toluene were mixed at the reaction temperature stated in the Table, and a solution of 0.55 mmol of MMA in 5 ml of toluene was added. Stirring was carried out for 20 minutes. 200 mmol of distilled MPiv were then added.

23 mmol of MMA were added to the initiator composition thus obtained and polymerization was carried out at the temperature stated in the Table. After the reaction time stated in the Table, the reaction was stopped with methanol and the solvent was removed under reduced pressure, the residue was taken up in benzene and the solution was filtered and freeze-dried.

Example 6

The initiator composition was prepared as described under Examples 1 to 5, at the temperature stated in the Table. However, a mixture of 200 mmol of undistilled MPiv with 0.1 ml of 1.9 molar AlEt$_3$ solution in toluene was used instead of the distilled MPiv.

115 mmol of MMA were then added and polymerization was carried out at the stated temperature.

After the time stated in the Table, the reaction was stopped by adding methanol and the product was precipitated by means of methanol acidified with HCl, filtered off and dried under reduced pressure.

Example 7

The initiator composition was prepared as described in Example 6, except that 77.6 ml of ethylbenzene were used instead of the toluene. Thereafter, 23 mmol of MMA were added and the reaction mixture was stirred for 2.5 hours. A further 23 mmol of MMA were then added and stirring was carried out for a further hour. Working up was effected as described under Example 6.

Example 8

The experiment was carried out as described in Example 6, except that a mixture of 50 mmol of DOP and 0.05 ml of a 1.9 molar solution of AlEt$_3$ in toluene was used instead of the mixture of MPiv and AlEt$_3$ and 23 mmol of MMA were used instead of the 115 mmol of MMA.

Examples 9 and 10

The experiments were carried out as described under Example 8, at the temperatures stated in the Table, except that 77.6 ml of ethylbenzene were used instead of the toluene.

Examples 11 and 12

The experiments were carried out as described under Example 8, at the temperatures stated in the Table. However, a mixture of 23 mmol of MMA and 0.1 ml of a 1.9 molar solution of AlEt$_3$ in toluene was used instead of a solution of MMA in toluene.

Example 13

The experiment was carried out as described under Example 6, except that tBuMA was used instead of MMA for the preparation of the initiator composition and 23 mmol of tBuMA were polymerized instead of the 115 mmol of MMA.

Comparative Example V1

The experiment was carried out as stated under Example 1. However, no MPiv was present.

Comparative Example V2

The experiment was carried out as described under Example 4. However, methyl acetate (MA) was used instead of MPiv.

Comparative Example V3

The experiment was carried out as described under Example 4, except that ethyl formate (EF) was used instead of MPiv.

Details of the experimental procedure and the characterization of the products are shown in the Table below.

TABLE 1

Polymerization of MMA or tBMA in the presence of tBuLi, AlEt$_3$ and an ester

| Ex. No. | Ester | Ester [mol/l] | Solvent | Temp. [°C.] | $c_{MMA}$ [vol %] | $M_{n,theor}$ [g/mol] | Time [h] | $M_{n,GPC}$ [g/mol] | $M_w/M_n$ | Time [h] | $M_{n,GPC}$ [g/mol] | $M_w/M_n$ | Tacticity rr triads [%] | Polymer yield*) [%] |
|---|---|---|---|---|---|---|---|---|---|---|---|---|---|---|
| 1 | MPiv | 2.0 | T.[b] | −78 |  | 4710 | 26 | 6470 | 1.08 |  |  |  | 83 | 91 |
| 2 | MPiv | 2.0 | T. | −51 |  | 4690 | 8.4 | 7791 | 1.14 |  |  |  | 79 | 82 |
| 3 | MPiv | 2.0 | T. | −23 |  | 4620 | 3.6 | 10940 | 1.10 |  |  |  | 72 | 86 |
| 4 | MPiv | 2.0 | T. | −15 | 2.4 | 5300 | 2.5 | 17700 | 1.29 | 4 | 18300 | 1.32 | 73 | 100 |
| 5 | MPiv | 2.0 | T. | 0 |  | 5240 | 2.3 | 11640 | 1.26 |  |  |  | 61 | 99 |
| 6 | MPiv | 1.9 | T. | −15 | 11.3 | 25700 | 4 | 73900 | 1.51 |  |  |  | 73 | 90 |
| 7 | MPiv | 1.9 | EtB.[c] | −15 | 2.2 | 5300/ 10600 | 2.5 | 11000 | 1.38 | 3.5 | 18100 | 1.55 | 64 | 68 |
| 8 | DOP | 0.5 | T. | −15 | 2.6 | 5300 | 2.5 | 9000 | 1.34 |  |  |  | 79 | n.d. |
| 9 | DOP | 0.5 | EtB. | −15 | 2.4 | 5300 | 2.5 | 12100 | 1.13 |  |  |  | n.d. | n.d. |
| 10 | DOP | 0.5 | EtB. | 0 | 2.5 | 5300 | 0.5 | 17600 | 1.17 | 1 | 19800 | 1.31 | n.d. | n.d. |
| 11 | DOP | 0.3 | EtB. | 0 | 5.6 | 5300 | 0.4 | 15300 | 1.19 | 0.5 | 15900 | 1.24 | 75 | n.d. |
| 12 | DOP | 0.5 | EtB. | 0 | 3.1 | 1700 | 0.3 | 6200 | 1.15 |  |  |  | n.d. | n.d. |
| 13[a] | MPiv | 2.0 | T. | −15 | 3.2 | 7400 | 4 | 8300 | 1.82 |  |  |  | n.d. | 61 |
| V1 | — | — | T. | −78 |  | 1890 | 18.8 | 1610 | 1.69 |  |  |  | 78 | 32 |
| V2 | MA | 2.0 | EtB. | −15 | 2.4 | 5300 | 2.5 |  |  |  |  |  | — | <5%[d] |
| V3 | EF | 0.4 | EtB. | −15 | 6.3 | 5300 | 0.5 | 600 | 7 |  |  |  | — | [d] |

[a] Polymerization of tBuMA
[b] T.: Toluene
[c] EtB.: Ethylbenzene
[d] Oligomers
*) based on the amount of monomer used
n.d.: not determined

Preparation of block copolymers from MMA and tBuMA

Example 14

In a first step, a mixture of 71 mmol of MMA and 0.2 mmol of a 1.9 molar solution of $AlEt_3$ in toluene was prepared and the MMA was polymerized as stated under Example 11. After the time stated in Table 2, a mixture of 46 mmol of tBuMA and 0.3 ml of a 1.9 molar $AlEt_3$ solution in toluene was added. Stirring was carried out at 0° C. for the time stated in Table 2.

Example 15

The experiment was carried out as described under Example 14, except that a mixture of 71 mmol of MMA and 0.3 ml of a 1.9 molar. solution of $AlEt_3$ in toluene and a mixture of 46 mmol of tBuMA and 0.3 ml of a 1.9 molar solution of $AlEt_3$ in toluene were used.

The results are shown in Table 2.

TABLE 2

Block copolymers of MMA and tBuMA in the presence of tBuLi, $AlEt_3$ and DOP

| Ex. No. | $c_{DOP}$ [mol/l] | Solvent | Temp. [°C.] | $c_{MMA}$ [% by vol.] | $c_{tuBMA}$ [% by vol.] | PMMA Mn [g/mol] | Mn/Mw | t-BuMA addition after [min] | P(MMA-b-tuBMA) Mn [g/mol] | Mn/Mw | Stirring time [min] | Polymer yield*) [%] |
|---|---|---|---|---|---|---|---|---|---|---|---|---|
| 14 | 0.32 | EtB[a)] | 0 | 5.4 | 5.3 | 18300 | 1.26 | 30 | 29800 | 1.29 | 50 | 70 |
| 15 | 0.56 | EtB | 0 | 3.3 | 4.7 | 6200 | 1.15 | 20 | 11100 | 1.59 | 30 | 100 |

[a)]EtB: Ethylbenzene
*)based on the amount of monomer used

Examples 16 and 17

1.1 mmol of MMA, dissolved in 5 ml of toluene, were added to a mixture of 3.2 mmol of $AlMe_3$ and 0.9 mmol of tBuLi in 95 ml of toluene, and stirring was carried out at 0° C. for 20 minutes. The mixture was then cooled to the reaction temperature stated in Table 3. At this temperature, a mixture of 46 mmol of nBuA and 400 mmol of MPiv in 45 ml of toluene was mixed in. After the time stated in Table 3, the polymerization reaction was stopped with a mixture of methanol and glacial acetic acid, the solvent was removed under reduced pressure, the residue was taken up in benzene and the solution was filtered and freeze-dried.

Comparative Example V4

The experiment was carried out as described under Examples 16 and 17, but in the absence of MPiv.

The results are shown in Table 3.

TABLE 3

Polymerization of nBuA

| Example No. | Ester | Ester [mol/l] | Temp. [°C.] | $C_{nBuA}$ [% by vol] | $M_n$ theor. [g/mol] | Time [h] | $M_n$, GPc [g/mol] | $M_w/M_n$ | Polymer yield [%] |
|---|---|---|---|---|---|---|---|---|---|
| 16 | MPiv | 2 | −78 | 0.23 | 5100 | 0.7 | 17500 | 1.39 | 78 |
| 17 | MPiv | 2 | −50 | 0.23 | 4900 | 0.7 | 15200 | 1.67 | 75 |
| V4 | — | — | −78 | 0.23 | 3900 | 0.3 | 4200 | 2.04 | 58 |

We claim:

1. A process for the preparation of polyacrylates based on alkyl acrylates or alkyl alkylacrylates or mixtures thereof as monomers in the presence of an initiator composition containing an alkali metal ester enolate and an organic aluminum compound, wherein an ester which differs from the monomers is present in the initiator composition, the carbon atom α to the ester group having no acidic proton.

2. A process as claimed in claim 1, wherein the ester used in the initiator composition is a pivalic ester, benzoic ester or phthalic ester.

3. A process as claimed in claim 1, wherein the ester used in the initiator composition is methyl pivalate, methyl benzoate or diisooctyl phthalate.

4. A process as claimed in claim 1, wherein the polymerization reaction is carried out in a nonpolar solvent.

5. A process for the preparation of polyacrylates as claimed in claim 1, wherein an alkali metal ester enolate is mixed with the aluminum compound and the ester, and the monomers are then added.

6. A process for the preparation of polyacrylates as claimed in claim 1, wherein an alkyl- or alkylaryl-alkali metal compound or a mixture thereof is mixed with the aluminum compound in a first step, a stoichiometric amount, based on the alkali metal compound, of an alkyl alkylacrylate is added in a second step, the ester is added in a third step and the remaining amount of monomers is added in a further step.

7. An initiator composition containing an alkali metal ester enolate, an organic aluminum compound and an ester which differs from alkyl alkylacrylates and has no acidic proton on the carbon atom α to the ester group.

8. A process for the preparation of an initiator composition containing an alkali metal ester enolate, an organic aluminum compound and an ester which differs from alkyl alkylacrylates and has no acidic proton on the carbon atom α to the ester group, wherein an alkyl- or alkylaryl-alkali metal compound or a mixture thereof is mixed with the aluminum compound in a first step, a stoichiometric amount, based on the alkali metal compound, of an alkyl alkylacrylate is added in a second step and the ester is added in a third step.

* * * * *